June 4, 1968  P. P. GRAD  3,387,153

BEARING ASSEMBLY

Filed Aug. 2, 1965  2 Sheets-Sheet 1

INVENTOR.
PETER P. GRAD
BY
Brumbaugh, Free, Graves & Donohue
his ATTORNEYS

June 4, 1968 P. P. GRAD 3,387,153
BEARING ASSEMBLY
Filed Aug. 2, 1965 2 Sheets-Sheet 2

INVENTOR.
PETER P. GRAD
BY
his ATTORNEYS

United States Patent Office 3,387,153
Patented June 4, 1968

3,387,153
BEARING ASSEMBLY
Peter P. Grad, Woodstock, N.Y., assignor to Rotron Manufacturing Company, Inc., Woodstock, N.Y., a corporation of New York
Continuation-in-part of application Ser. No. 443,798, Mar. 30, 1965. This application Aug. 2, 1965, Ser. No. 477,662
13 Claims. (Cl. 310—90)

This application is a continuation-in-part of application Ser. No. 443,798, filed Mar. 30, 1965, now abandoned.

The present invention relates to bearings, and more particularly to bearing assemblies for rotating machinery, such as electric motors, which are lubricated for life and require no attention during use.

In many applications, it is desirable that the bearings used to journal relatively rotating members be maintenance-free and at the same time, have an extended life at optimum performance. This is particularly important in the case of electric motors such as are used in fans and other air moving equipment, where it is often difficult to get to the motor bearings to apply a lubricant.

One of the more successful types of bearings providing these features employs a porous bearing element, such as of sintered bronze, associated with a lubricant reservoir such that the lubricant slowly filters through the porous bearing material and into the bearing area to maintain the requisite lubricant film. An improvement on this bearing arrangement provides a groove longitudinally of the bearing adjacent its outer surface to allow lubricant which tends to be driven out of the bearing element itself to flow back into the reservoir. This provides an oil circulation feature which, in effect, self-lubricates the bearing.

These prior art arrangements however, are unsatisfactory in various respects and present manufacturing and assembly difficulties, which add to their cost and detract from their useful service life. Accordingly, it is the object of the present invention to provide an improved bearing arrangement in which the disadvantages of the prior art systems are avoided.

It is a further object of the present invention to provide an improved bearing assembly which may be easily assembled and which provides a lubricant circulating feature to insure an ample supply of lubricant continuously at the bearing surfaces.

Still another object of the invention is to provide a readily assembled bearing arrangement that provides a degree of self-alignment and reduces noise in rotating machinery.

The bearing arrangement in accordance with the invention comprises basically a plurality of bearing elements of a porous material in annular form, one of the diameters being such as to engage a bearing surface of one of the rotating members with conventional bearing clearance. The other diameter of the bearing element is such as to provide a substantial clearance from the complementary cylindrical surface of the other relatively rotating member. The bearing elements are securely fixed to the latter member by means of resilient elements, such as O-rings, mounted on the bearing elements and tightly engaging the mating surface on the member. In one embodiment, the bearing elements are separate and distinct units and a felt pad or other lubricant retaining arrangement is disposed between them to provide a lubricant reservoir. A second embodiment has the bearing elements integrally formed at spaced locations on a single, generally cylindrical member of porous material, the portion of the member between the bearing elements acting as the lubricant reservoir. In both embodiments, means are also provided adjacent the outermost surfaces of the bearings to prevent escape of the lubricant. One of these latter arrangements also acts as a thrust bearing in conjunction with the outermost radial surface of the associated bearing element.

The resilient O-ring for mounting the bearing element provides several advantages. Besides being dimensioned so as to afford a tight-fitting engagement between the bearing element and its associated supporting member, so that the two are fixed to one another, it permits, in conjunction with the clearance provided between the element and the member, a certain degree of self-alignment of the bearing, thereby lessening manufacturing and assembly problems. The resilient mounting of the bearing elements also acts as a cushion to eliminate rattles and other noise that often occur in rotating machinery.

A lubricant flow arrangement within the bearing element is also established by the resilient member, setting up several circulatory paths for the lubricant within the bearing element itself, which assist in maintaining the proper supply of lubricant at the bearing surfaces. In the electric motor application, it also acts as a thermal insulator, reducing the amount of heat coupled from the motor windings to the bearing area, thereby extending the bearing life.

These and other objects, features, and advantages of the invention will become more apparent from the following detailed description thereof, when taken in conjunction with the accompanying drawings in which.

Figure 1:
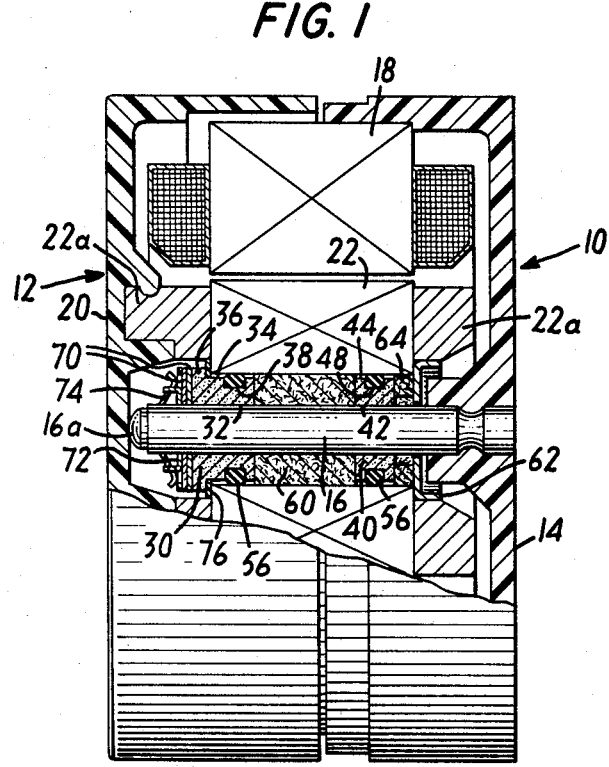
FIGURE 1 is an illustration in partial section of an electric motor incorporating one embodiment of the bearing arrangement of the present invention.

The details of the conventional motor construction illustrated in FIGURE 1 are incidental to the bearing arrangement of the invention and will be described only briefly. The motor, which is shown to be of the induction type, includes a stator portion 10 which may include any appropriate mounting brackets or feet for securing to a surface, and a rotor portion 12. Fan blades or other output arrangements may be secured to the rotor 12 in any suitable fashion.

The stator 10 includes a cylindrical housing 14, of plastic or castable metal such as zinc or aluminum alloys, which supports in cantilever fashion an axially located shaft 16. As shown, the shaft is held firmly in place by molding or casting the plastic or metal of the housing 14 about an annular groove in one end of the shaft. The stator stack 18 is cemented, pressed or cast or otherwise rigidly secured to the housing 14 adjacent its outer extremity.

The rotor 12 similarly includes a housing 20, which may also be of plastic, and which surrounds the portion of the stator stack 18 extending axially beyond the stator housing 14. The rotor stack 22 is of appropriate diameter to provide the necessary air gap with the stator stack 18, and its end rings are formed, such as by casting, of a conductive metal, e.g., aluminum. One of the end rings is provided with a circumferential groove to engage a suitably provided circular detent in a groove formed on the interior end wall of the housing 20. Thus the rotor stack 22 may be assembled to the housing 20 by pressing it into the detent groove until it snaps in.

It will be understood, of course, that upon application of alternating current energy to the stator windings, a rotating magnetic field will be established causing rotation of the rotor stack 22 about the shaft 16. The rotor housing 20, as well as the output devices attached thereto, will similarily be set into rotation. As will become apparent, the motor illustrated is by way of example only, and the bearing arrangement to be described may be used wherever applicable to journal a pair of relatively rotating members.

Figure 2:
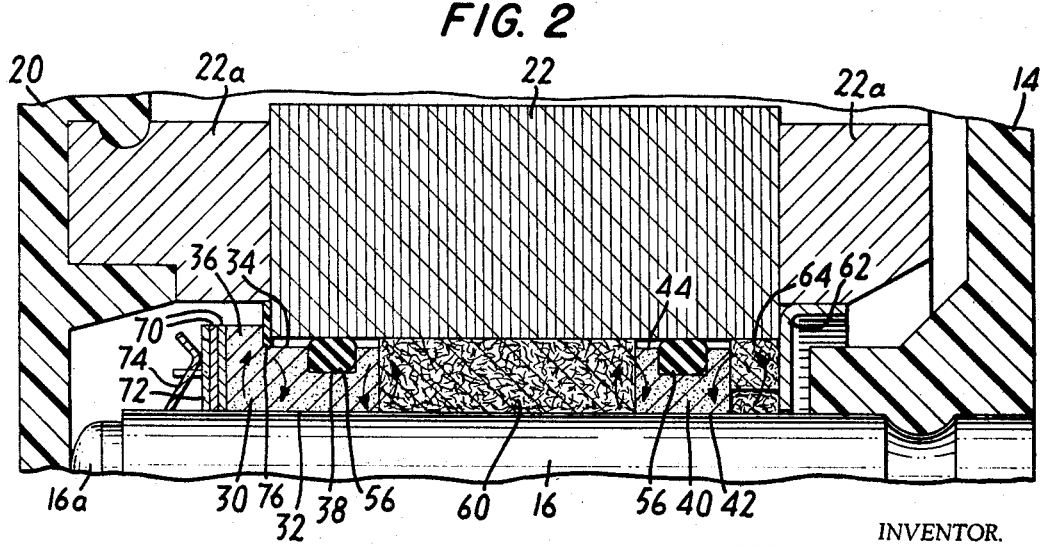
FIGURE 2 is an enlarged detail of the bearing arrangement shown in FIGURE 1, useful in explaining its operation.

One form of the novel bearing arrangement, which is best shown in FIGURE 2, includes a pair of separate bearing elements 30, 40, formed of a porous material such as sintered bronze. The bearing elements are annular in form, having inner circumferential surfaces 32, 42 of a diameter to properly engage the shaft 16 in close fitting, i.e. bearing, relationship. The outer diameters of the bearing elements, 34, 44, are such as to provide a significant clearance with respect to the inner surface of the axial bore in the rotor stack 22. The bearing element 30 also includes a flange 36 at one end thereof whose outer diameter is greater than the axial bore in the rotor stack 22.

Each of the bearing elements is provided with a circumferential groove 38, 48 extending completely around its peripheral surface. Mounted in the grooves are resilient members, such as rubber O-rings, which in accordance with conventional techniques, have a cross-sectional area somewhat greater than the area of the groove. The dimensions of the groove and the O-ring are also selected to provide tight fitting engagement between the O-ring and the bore in the rotor stack 22 upon assembly of the bearing elements.

Surrounding the shaft 16 between the inner radial surfaces of the bearing elements 30, 40, is a lubricant reservoir or wick 60. This may be most conveniently provided by a layer of felt which is wrapped around the shaft and impregnated or charged with a suitable supply of lubricant. The ends of the wick 60 contact the inner radial surfaces of the bearing elements and thus permit the flow of lubricant therebetween.

A cup-shaped retaining ring 62 is cemented or otherwise fastened to the rotor stack 22 adjacent the inboard or fixed end of the shaft 16. The ring 62 is provided with a central opening surrounding the shaft with minimal clearance, so that escape of lubricant along the shaft is prevented. Between the outer radial surface of the bearing 42 and the retaining ring 62 is provided a washer or felt or other lubricant retaining material 64, as will be discussed further hereinafter.

A thrust bearing assembly is provided adjacent the free end of the shaft in association with the outer radial surface of the bearing element 30. The thrust assembly includes a pair of washers 70 which are mounted for ready rotation about the shaft 16, the inner most one of which bears up against the outer radial surface of the bearing element 30. A keeper ring 72 includes a plurality of axially extending tabs which engage suitable apertures in a grip ring 74. The latter is a commercially available device and includes a number of angularly oriented fingers having sharp edges which engage the shaft 16 when pressed over it from its free end, and thus resist any motion tending to push it off. The engagement also is such that it will not rotate relative to shaft 16. With the tabs on the keeper ring 72 interlocked with the grip ring 74, the ring 72 likewise is held against rotation with respect to shaft 16. The washers 70 however are free to rotate and thus provide a differential thrust bearing action for the rotating bearing element 30.

A shock ring 76 is cemented to the end of the rotor winding 22 to fill the space between the flange 36 on the bearing element 30 and the end of the rotor stack 22. The ring 76 may be made of a resilient plastic or rubber and serves to absorb small, sudden axial thrust forces that might occur during operation of the motor.

The free end of the shaft 16 is provided with a rounded extension 16a which barely clears the inner surface of the rotor housing 20 during operation. In the embodiment illustrated, no contact occurs during normal operation of the motor, and a more sophisticated thrust bearing is not required. The rounded end 16a in conjunction with the interior surface of the housing 20 does provide, however, a thrust bearing of sufficient quality to enable operation under intermittent thrust forces in the direction opposite to the main thrust force.

Turning now to FIGURE 2, the arrows indicate the circulatory lubricant flow paths provided by the porous bearing elements which maintains full lubrication at all times. Since the O-rings are impervious to the lubricant and effect a fluid-tight seal with the interior of the rotor stack 22, lubricant does not flow across the outer circumferential surface of the bearing elements into the wick 60. Rather, for each bearing several shorter circulation paths are present. Adjacent the inner radial surface of the bearing element 30, a flow of lubricant occurs from the shaft, through the wick 60 into the bearing element 30, and back to the bearing area at the shaft. At the flanged end of the bearing element, the lubricant flows from the shaft into the material of the bearing element and then back to the shaft as indicated by the arrows. It will be realized, of course, although the aforementioned fluid flow patterns are set up in the bearing material, the porosity of the bearing material maintains it substantially saturated with lubricant at all times.

Some of this lubricant finds its way to the interface between the first washer 70 and the outer radial surface of the bearing element 30 and also, out of the flange 36. Although the thrust bearing assembly formed by elements 70, 72, and 74 in association with the outer radial surface of the bearing element 30 serves to prevent any substantial escape of lubricant from the bearing element 30, enough finds its way out of the flange 36 to lubricate the elements of the thrust bearing and also to furnish lubrication to the shaft end 16a. The shock ring 76 serves to seal off a chamber surrounding the thrust bearing structure so that lubricant cannot flow into the remainder of the motor structure.

The bearing element 40 sets up similar lubricant flow patterns. The felt washer 64 serves to accumulate some of the lubricant tending to leave the bearing surface and acts as a secondary reservoir, feeding lubricant back to the bearing element adjacent its peripheral surface. Minimal clearance is maintained between the retaining ring 62 and the shaft 16 to prevent escape of the lubricant along the shaft. It will be seen, therefore, that no lubricant is lost and reoiling is not required.

Figure 3:
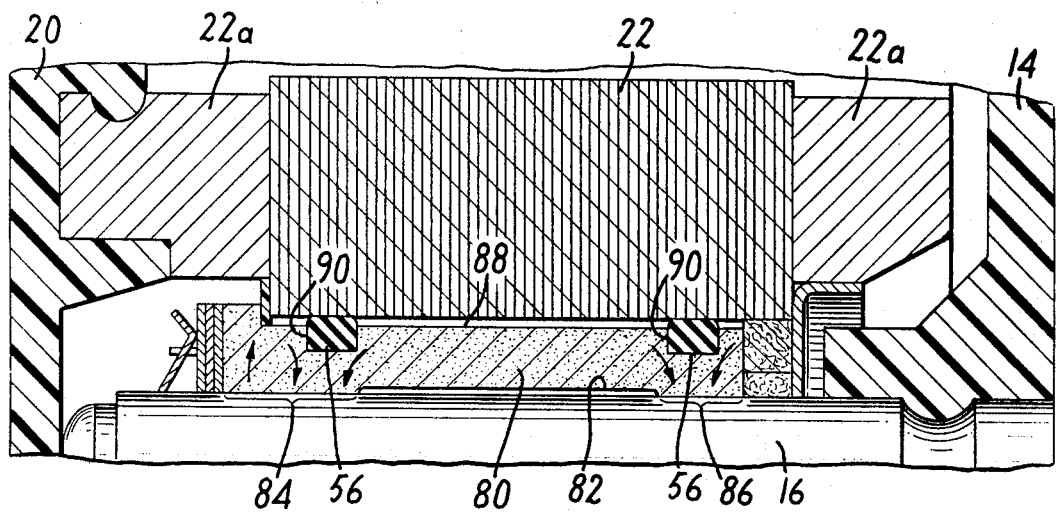
FIGURE 3 is a view similar to FIGURE 2 but illustrating another embodiment of the invention.

The modification illustrated in FIGURE 3 employs a unitary member 80 which provides both the bearing elements and the lubricant reservoir. As shown, the member 80 is generally cylindrical in form with its bore having an increased diameter portion 82 over part of its length, leaving smaller diameter portions 84, 86 at its respective ends to serve as the bearing elements. The outer surface 88 of the member 80 is slightly smaller in diameter than the bore in the rotor stack 22 and has a pair of circumferential grooves 90 opposite the respective bearing elements for accommodating O-rings 56. The remainder of the construction of FIGURE 3 is the same as that of FIGURE 2.

The O-rings 56 in the arrangement of FIGURE 3 establish lubricant flow paths (indicated by the arrows) substantially the same as in FIGURE 2. The member 80 is formed entirely of a porous material, e.g. sintered bronze, which is saturated with a lubricant prior to assembly in the motor and thus the portion between the bearing elements 84, 86 acts as the lubricant reservoir in the same way as the wick 60 of the embodiment of FIGURES 1 and 2.

In both embodiments, besides dividing the lubricant flow paths, the O-rings 56 serve to rigidly hold the bearing units to the rotor stack 22. By properly dimensioning the outer diameter of the O-ring 56, the bearing units can be tightly fitted into the rotor stack with a minimum of effort so as to rotate with the stack, while at the same time maintaining a slight clearance between the outer surfaces of the bearing units and the bore in the rotor stack. The axial force provided by the thrust bearing assembly also assists in maintaining the bearing units fixed to the rotor so that they move therewith about the shaft 16.

Since the bearing units themselves are not in contact with the rotor stack 22, but are coupled thereto only by the resilient O-rings, vibration and noises are minimized. Moreover, the combination of the resiliency of the O-rings and the clearance between the bearing units and the rotor enables a small amount of self-aligning action to take place. This in turn allows some relaxation of tolerances on the parts and simplifies assembly procedure. As an added advantage, heat conduction between the bearing areas and the remainder of the structure is minimized.

Although several preferred embodiments in accordance with the invention have been illustrated, it will be realized that many modifications thereof will occur to those skilled in the art within the scope of the invention. For example, if desired, the bearing units may be modified to cooperate with a thrust bearing arrangement such as at 70, 72 and 74, to provide thrust bearings for both directions of thrust. Also, in case of a shaft of extended length, additional bearing units, either of the type shown in FIGURE 2 or FIGURE 3 may be employed.

Although in the embodiments shown, the shaft is stationary and the O-rings are on outer surface of the bearing units, other arrangements may be employed. In the case of a rotating shaft for example, the peripheral grooves in the bearing may be on its inner circumferential surface whereby the bearing is fixed for rotation with the shaft.

Other variations incorporating the principles of the invention also will be seen to be possible and, accordingly, the invention should not be limited except as set forth in the appended claims.

I claim:

1. A bearing arrangement for a pair of concentrically disposed relatively rotating members having complementary cylindrical surfaces of different diameter providing an annular space therebetween comprising, a plurality of annular bearing elements having a radial thickness less than the annular space between said members and disposed therein, one of the circumferential surfaces of each of said bearing elements being of a diameter to engage one of said complementary cylindrical surfaces in close-fitting relationship, a resilient member disposed about the other circumferential surface of each of said bearing elements and tightly engaging the other of said complementary surfaces such that no relative rotation occurs therebetween, and lubricant retaining means between said bearing elements for supplying a lubricant to the areas of said members and said bearing elements in close-fitting relationship.

2. A bearing arrangement for use between a shaft and a surrounding member having an axial bore greater in diameter than said shaft comprising, a plurality of annular bearing elements spaced along said shaft having inner diameters to receive said shaft in close-fitting relationship and outer diameters less than the diameter of said axial bore, resilient means extending circumferentially about the peripheral surface of each of said bearing elements to effect tight-fitting engagement between said bearing elements and said surrounding member such that no relative rotation occurs therebetween, lubricant reservoir means along said shaft between said bearing elements, and means to prevent substantially the escape of lubricant outwardly of the outermost radial surfaces of said bearing elements.

3. A bearing arrangement for a pair of concentrically disposed relatively rotating members having complementary cylindrical surfaces of different diameter providing an annular space therebetween comprising, a plurality of annular porous bearing elements having a radial thickness less than the annular space between said members and disposed therein, one of the circumferential surfaces of each of said bearing elements being of a diameter to engage one of said complementary cylindrical surfaces in close-fitting relationship, a resilient member disposed about the other circumferential surface of each of said bearing elements and tightly engaging the other of said complementary surfaces such that no relative rotation occurs therebetween, lubricant retaining means between said bearings in contact with a radial surface thereof whereby lubricant is conducted through said porous elements, and means to prevent substantially the escape of lubricant outwardly of the outermost radial surfaces of said bearing elements.

4. A bearing arrangement for a pair of concentrically disposed relatively rotating members having complementary cylindrical surfaces of different diameter providing an annular space therebetween comprising, a plurality of annular bearing elements integrally formed at spaced locations on a generally cylindrical member of porous material disposed in said annular space, said bearing elements having a radial thickness less than the annular space between said relatively rotating members, one of the circumferential surfaces of each of said bearing elements being of a diameter to engage one of said complementary cylindrical surfaces in close-fitting relationship, a resilient member disposed about the other circumferential surface of each of said bearing elements and tightly engaging the other of said complementary surfaces such that no relative rotation occurs therebetween, the portion of said cylindrical member between said bearing elements being out of contact with either of said complementary surfaces and providing lubricant retaining means for supplying a lubricant to the areas of said bearing elements and said one of said complementary surfaces in close-fitting relationship.

5. A sealed-lubricant bearing arrangement for journalling a rotating member on a stationary shaft, said rotating member having an axial bore of greater diameter than said shaft, said bearing assembly comprising a plurality of annular porous bearing elements spaced apart along said shaft having inner diameters to receive said shaft in close-fitting relationship and outer diameters less than the diameter of said axial bore, an annular groove extending circumferentially about the peripheral surface of each of said bearing elements, resilient means retained in said annular grooves and extending beyond the periphery of said bearing elements and into tight-fitting engagement with the wall of said axial bore, lubricant reservoir means along said shaft between said bearing elements, and means to prevent substantially the escape of lubricant outwardly of the outermost radial surfaces of said bearing elements.

6. The bearing arrangement of claim 5 wherein said bearing elements are separate and distinct units and said lubricant reservoir means is disposed along said shaft between and in contact with said bearing elements.

7. The bearing arrangement of claim 5 wherein said bearing elements are integrally formed at spaced locations on a generally cylindrical member of porous material, the portion of said member between said elements serving as a lubricant reservoir.

8. A sealed-lubricant bearing arrangement for journalling a rotating member on a stationary shaft, said rotating member having an axial bore of greater diameter than said shaft, said bearing assembly comprising a plurality of individual annular porous bearing elements spaced apart along said shaft having inner diameters to receive said shaft in close-fitting relationship and outer diameters less than the diameter of said axial bore, an annular groove extending circumferentially about the peripheral surface of each of said bearing elements, lubricant impervious resilient means retained in said annular grooves and extending beyond the periphery of said bearing elements and into tight-fitting engagement with the wall of said axial bore, whereby said bearing elements rotate with said member, lubricant retaining means surrounding said shaft between said bearing elements and in contact with the inner radial surfaces thereof, and means to prevent substantially the escape of lubricant outwardly from the outermost radial surfaces of said bearing elements.

9. A bearing arrangement for journalling a rotating member on a stationary shaft, said rotating member having an axial bore of greater diameter than said shaft, said bearing assembly comprising a pair of individual annular bearing elements spaced apart along said shaft having inner diameters to recive said shaft in close-fitting relationship and outer diameters less than the diameter of said axial bore, an annular groove extending circumferentially about the peripheral surface of each of said bearing elements, lubricant impervious resilient means retained in said annular grooves and extending beyond the periphery of said bearing elements and into tight-fitting engagement with the wall of said axial bore, whereby said bearing elements rotate with said member, lubricant retaining means surrounding said shaft between said bearing elements and in contact with the inner radial surfaces thereof, and means mounted on said shaft forming a thrust bearing with the outer radial surface of one of said bearing elements.

10. A sealed-lubricant bearing arrangement for journalling a rotating member on a stationary shaft, said rotating member having an axial bore of greater diameter than said shaft, said bearing assembly comprising a pair of individual annular porous bearing elements spaced apart along said shaft having inner diameters to receive said shaft in close-fitting relationship and outer diameters less than the diameter of said axial bore, an annular groove extending circumferentially about the peripheral surface of each of said bearing elements, lubricant impervious resilient means retained in said annular grooves and extending beyond the periphery of said bearing elements and into tight-fitting engagement with the wall of said axial bore, whereby said bearing elements rotate with said member, lubricant retaining means surrounding said shaft between said bearing elements and in contact with the inner radial surfaces thereof, means mounted on said shaft forming a thrust bearing with the outer radial surface of one of said bearing elements and substantially preventing the escape of lubricant therefrom, and means fixed to said rotating member and surrounding said shaft to prevent substantially the escape of lubricant from the outer radial surface of the other of said bearings.

11. A bearing arrangement according to claim 10 wherein said thrust bearing comprises a retaining ring fixed to said shaft and spaced outwardly of the outer radial surface of said one of said bearing elements, and a plurality of washer elements freely rotatable about said shaft substantially filling the space between said retaining ring and said outer radial surface of said bearing element.

12. In a dynamoelectric machine, a stator including a cylindrical shaft, a rotor surrounding said shaft having an axial bore of greater diameter than said shaft, a pair of individual annular porous bearing elements spaced apart along said shaft having inner diameters to receive said shaft in close-fitting relationship and outer diameters less than the diameter of said rotor bore, an annular groove extending circumferentially about the peripheral surface of each of said bearing elements, lubricant impervious O-rings retained in said annular grooves and extending beyond the periphery of said bearing elements and into tight-fitting engagement with the wall of said axial bore, whereby said bearing elements rotate with said rotor, lubricant retaining means surrounding said shaft between said bearing elements and in contact with the inner radial surfaces thereof, means mounted on said shaft forming a thrust bearing with the outer radial surface of one of said bearing elements and substantially preventing the escape of lubricant therefrom, and means fixed to said rotor and surrounding said shaft to prevent substantially the escape of lubricant from the outer radial surface of the other of said bearings.

13. In a dynamoelectric machine, a stator including a cylindrical shaft, a rotor surrounding said shaft having an axial bore of greater diameter than said shaft, a pair of annular bearing elements integrally formed at spaced locations on a generally cylindrical member of porous material disposed about said shaft, said bearing elements having inner diameters to receive said shaft in close-fitting relationship and outer diameters less than the diameter of said rotor bore, an annular groove extending circumferentially about the peripheral surface of each of said bearing elements, lubricant impervious O-rings retained in said grooves and extending beyond the periphery of said bearing elements and into tight-fitting engagement with the wall of said axial bore, whereby said cylindrical member including said bearing elements rotates with said rotor, the portion of said cylindrical member between said bearing elements providing lubricant retaining means for supplying lubricant to the areas of said bearing elements and said shaft in close-fitting relationship, means mounted on said shaft forming a thrust bearing with the outer radial surface of one of said bearing elements and substantially preventing the escape of lubricant therefrom, and means fixed to said rotor and surrounding said shaft to prevent substantially the escape of lubricant from the outer radial surface of the other of said bearings.

References Cited
UNITED STATES PATENTS

| | | | |
|---|---|---|---|
| 2,769,934 | 11/1956 | Stone et al. | 310—90 |
| 2,845,552 | 7/1958 | Robinson | 310—90 |
| 2,904,709 | 9/1959 | Lauther | 310—90 |
| 2,945,729 | 7/1960 | Mitchell | 310—90 |
| 3,038,765 | 6/1962 | Tupper | 310—90 |
| 3,161,794 | 12/1964 | Lindgren | 310—90 |
| 3,195,466 | 7/1965 | Young | 310—90 |
| 3,319,098 | 5/1967 | Hartman | 310—90 |

MILTON O. HIRSHFIELD, *Primary Examiner.*

L. L. SMITH, *Assistant Examiner.*